United States Patent
Doerr et al.

(10) Patent No.: US 9,710,705 B2
(45) Date of Patent: Jul. 18, 2017

(54) METHOD FOR INSERTING FEATURES INTO A THREE-DIMENSIONAL OBJECT AND METHOD FOR OBTAINING FEATURES FROM A THREE DIMENSIONAL OBJECT

(71) Applicant: THOMSON LICENSING, Issy de Moulineaux (FR)

(72) Inventors: Gwenael Doerr, Rennes (FR); Xavier Rolland-Neviere, Marcq-en-Baroeul (FR); Pierre Alliez, Le Chesnay (FR)

(73) Assignee: Thomson Licensing, Issy-les-Moulineaux (FR)

( * ) Notice: Subject to any disclaimer, the term of this patent is extended or adjusted under 35 U.S.C. 154(b) by 55 days.

(21) Appl. No.: 14/839,974

(22) Filed: Aug. 29, 2015

(65) Prior Publication Data

US 2016/0063302 A1 Mar. 3, 2016

(30) Foreign Application Priority Data

Aug. 29, 2014 (EP) .................................... 14306342

(51) Int. Cl.
*G06K 9/00* (2006.01)
*G06T 1/00* (2006.01)
(Continued)

(52) U.S. Cl.
CPC ............ *G06K 9/0053* (2013.01); *G06T 1/005* (2013.01); *G06T 1/0021* (2013.01); *G06T 7/33* (2017.01);
(Continued)

(58) Field of Classification Search
CPC ..... G06T 7/0051; G06T 1/0021; G06T 1/005; G06T 2207/10012; G06T 7/0028; G06K 9/0053
(Continued)

(56) References Cited

U.S. PATENT DOCUMENTS

2015/0170313 A1* 6/2015 Rolland-Neviere ........................... G06K 9/4642 382/100

FOREIGN PATENT DOCUMENTS

CN 102903075 1/2013

OTHER PUBLICATIONS

Yan, et al. (Variational mesh segmentation via quadratic surface fitting), 1072-1082, CAD, 2012.*
(Continued)

*Primary Examiner* — Daniel Mariam
(74) *Attorney, Agent, or Firm* — Myers Wolin LLC

(57) ABSTRACT

A method for inserting features into a three-dimensional object is disclosed, wherein features correspond to original features of the three-dimensional object. The inserting method comprises determining a reference shape using the original features; determining a set of vertices on the three-dimensional original object at the intersection between the reference shape and the three-dimensional object; modifying the local neighborhood of the set of vertices so that their local neighborhood is close to a set of target shapes. A method for obtaining features from a three-dimensional object is further disclosed. The method comprises obtaining anchor vertices whose local neighborhood is close to a set of target shapes; fitting a reference shape onto the anchor vertices; and obtaining the features using the fitted reference shape. A 3D object carrying anchor vertices and devices for implementing the disclosed methods are further disclosed.

20 Claims, 5 Drawing Sheets

(51) Int. Cl.
*G06T 7/33* (2017.01)
*G06T 7/50* (2017.01)

(52) U.S. Cl.
CPC ...... *G06T 7/50* (2017.01); *G06T 2207/10012* (2013.01)

(58) Field of Classification Search
USPC .................................................. 382/100, 233
See application file for complete search history.

(56) References Cited

OTHER PUBLICATIONS

Profanter (Segmentation and Semantic Interpretation of Object Models), pp. 5-28, TUM, 2012.*
Sipiran et al: "Harris 3D: A robust extension of the Harris operator for interest point detection on 3D meshes", The Visual Computer, International Journal of Computer Graphics, vol. 27, n○11, pp. 963-976, Jul. 1, 2011.
Rondao Alface et al: "Blind and robust watermarking of 3D models: How to withstand the cropping attack ?", image Processing, ICIP 2007, IEEE, pp. V-465-V468, Sep. 1, 2007.
Zafeiriou et al: "Blind robust watermarking schemes for copyright protection of 3D mesh objects", IEEE Transactions on Visualization and Computer Graphics, vol. 11, n○5, pp. 596-607, Sep. 1, 2005.
Lavoue: "A roughness measure for 3D mesh visual masking", Proceedings APGV 2007, Symposium on Applied Perception in Graphics and Visualization, pp. 57-60, Jul. 25, 2007.
Ren et al: "Blind Mesh Watermarking Based on the Featured Points in the Frequency Domain", Second International Workshop on Knowledge Discovery and Data Mining. WKDD 2009; IEEE, pp. 701-704.
Kong et al: "A Novel Double 3D Digital Watermarking Scheme", Proceedings of the 2009 International Conference on Multimedia Information Networking and Security (MINES 2009); IEEE, pp. 553-556.
Montanola Sales et al: "Feature point-based 3D mesh watermarking that withstands the cropping attack", Proceedings of the SPIE—The International Society for Optical Engineering, vol. 7880, 78800A (10 pp.), 2009.
Hu et al: "Constrained optimisation of 3D polygonal mesh watermarking by quadratic programming", Proceedings of the 2009 IEEE International Conference on Acoustics, Speech and Signal Processing, 2009; pp. 1501-1504.
Bors et al: "Optimized 3D Watermarking for Minimal Surface Distortion", IEEE Transactions on Image Processing, pp. 1822-1835, May 2013; vol. 22, No. 5.
Wang et al: "Robust and blind mesh watermarking based on volume moments", Computer Graphics, pp. 1-40, 2011.
Rondao-Alface et al: "Blind watermarking of 3D meshes using robust feature points detection", IEEE International Conference on Image Processing, 2005; pp. 1-4.
Sun et al: "A Concise and Provably Informative Multi-scale Signature Based on Heat Diffusion," Proceedings of the Symposium on Geometry Processing, 2009; vol. 28, No. 5, pp. 1-11.
Chen et al: "Quantization Index Modulation Methods for Digital Watermarking and Information Embedding of Multimedia," J. VLSI Signal Process. Syst., vol. 27, pp. 7-33, 2001.
Cazals et al: "Estimating Differential Quantities Using Polynomial Fitting of Osculating Jets," Proceedings of the 2003 Eurographics/ACM SIGGRAPH Symposium on Geometry Processing, 2003; pp. 1-35.
Doerr et al: "Triangle Surface Mesh Watermarking based on a Constrained Optimization Framework", IEEE Transactions on Information Forensics and Security, Sep. 2014; vol. 9, No. 9, pp. 1491-1501.
Fischler et al: "Random Sample Consensus: A Paradigm for Model Fitting with Applications to Image", Communications of ACM, vol. 24, N○6, Jun. 1981; pp. 381-395.
Wu et al: "Digital watermark algorithm based on DWT for 3D point cloud model", Computer Engineering, vol. 38, No. 6, pp. 151-155, Mar. 2012.
Search Report Dated Mar. 30, 2015.

* cited by examiner

METHOD FOR INSERTING FEATURES INTO A THREE-DIMENSIONAL OBJECT AND METHOD FOR OBTAINING FEATURES FROM A THREE DIMENSIONAL OBJECT

This application claims the benefit, under 35 U.S.C. §119 of European Patent Application No. 14306342.8, filed Aug. 29, 2014.

TECHNICAL FIELD

In the following, a method to synchronize an altered three-dimensional object with an original three-dimensional object is disclosed in order to recover features of the three-dimensional object which are useful for watermark decoding. Specifically, a method for inserting features into of a three-dimensional object and a method for obtaining features from a three-dimensional object are disclosed. The corresponding three-dimensional object, devices and computer program are also disclosed.

BACKGROUND ART

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Resynchronization mechanisms for watermarking systems enable the watermark decoder to compute, from a potentially altered watermarked content, some information that has been used in the embedding stage to define the watermark carrier. This information is part of the underlying convention between the watermark embedder and detector upon which they relied to establish the watermarking communication channels. It is therefore required to re-compute the watermark carrier, and estimate the embedded payload. Without this information, or with erroneous information, the decoder cannot recover the payload, albeit said payload still being present within the content.

The popularity of 3D generated models has created the need for dedicated methods, designed to tackle robust watermarking of meshes. In the context of 3D watermarking, most watermarking systems rely on some robust primitive to compute the watermark carrier, such as the center of mass of the mesh as disclosed in "*Triangle Surface Mesh Watermarking based on a Constrained Optimization Framework*" (IEEE Transactions on Information Forensics and Security, 2014) by the same authors. Such a primitive is usually chosen to achieve a large robustness against potential attacks. For instance, when adding noise to the vertex positions, the center of mass is indeed a very stable reference primitive. However, its robustness against cropping wherein some portions of the mesh are removed and against a more general class of so-called "desynchronizing" operations which for instance adds noise only in parts of the mesh, is still an open problem.

The skilled in the art will appreciate that a non-blind watermarking system wherein the reference primitive is transmitted to the decoder, using for instance metadata, does not solve the resynchronization issue in 3D watermarking. Assuming that the decoder had knowledge of the position of the initial mesh center of mass, it would still not be able to compute the watermark carrier from a cropped and translated version of the watermarked mesh. The initial center of mass and the one that should be used to read the watermark from the attacked mesh would be offset because of the translation. Similarly, the center of mass estimated from the attacked mesh would also not coincide with the one that should be used due to the cropping operation. In other words, neither one of the two possible positions would be usable.

To address this problem, watermarking systems often rely upon a preprocessing stage, performed by both the embedder and the decoder, which results in a canonical partitioning of the mesh. For instance, in "*Blind and Robust Watermarking of 3D Models: How to Withstand the Cropping Attack?*" (IEEE International Conference on Image Processing, 2007), P. R. Alface et al. disclose a watermarking method that identifies feature points on the surface of a 3D mesh and defines a local neighborhood from them. This can be viewed as a partition of the 3D surface where a plurality of local neighborhoods is watermarked. Based on this partitioning, the watermark information is repeatedly embedded in each local neighborhood, thereby creating a redundancy of the payload in subparts of the mesh. Individual local neighborhoods are generally less affected by the aforementioned desynchronizing operations than a global watermark carrier such as the location of the center of mass. For instance, in the case of a cropping attack, each local neighborhood is often either lost (cropped out), or left unaltered. Thus, the watermark decoder can identify and use the remaining local neighborhoods to recover the watermark payload.

Watermarking systems relying on such partitioning still exhibit robustness issues. Firstly, such watermarking system assumes that the watermark detector is able to re-compute the same canonical partitioning as the embedder. However, this proves to be difficult in practice. Secondly, the watermark payload is no longer embedded in the whole mesh, but repeated in multiple sub-regions. This may decrease the overall robustness and/or the amount of embedded watermark information.

Thus, watermarking schemes based on stable reference primitive seem preferable and a synchronization mechanism that allows a reference primitive used during watermark embedding, possibly altered due to modifications to the cover 3D mesh (e.g. rotation, translation, scaling, cropping), to be recovered for watermark detection is therefore needed.

Outside the field of watermarking, methods for detecting features point on a 3D object have been studied. For instance, I. Sipiran and B. Bustos in "*Harris 3D: a robust extension of the Harris operator for interest point detection on 3D meshes*" (in The Visual Computer: International Journal of Computer Graphics, vol. 27, no. 11, pp. 963-976, 2011) present a detector of points of interest for 3D objects based on Harris operator. To that end, a quadratic surface is fitted on the local neighborhood around the feature point. Advantageously, the characteristics of the fitted surface are invariant to rigid transforms or scaling and allow recovering the feature point. However, Sipiran is silent on the recovery of stable reference primitive, such as a center of mass, from the features points.

SUMMARY

The present principles address the issue of a synchronization mechanism for 3D watermarking that enables the watermark detector to compute the same reference primitive as the one that was used by the watermark embedder, even when desynchronizing operations have been applied to the cover 3D mesh. A salient idea of the present principles is to introduce, before the embedding step, landmark feature points at specific locations on the surface of the mesh representing the 3D object. In the decoding process, these feature points are automatically identified, thereby recovering the set of specific locations. Then the configuration of such specific locations can be used to recover the reference primitive that was used during watermark embedding. Advantageously, when the reference primitive estimated from the attacked mesh has been altered, the watermark detector is still able to compute the initial reference primitive. For instance, if the center of mass of the received mesh has been altered because of a cropping attack, the decoder is still able to compute a position corresponding to the initial position of the center of mass that was used by the watermark embedding process.

Contrary to state-of-the-art approaches devised to tackle the synchronization problem, the present principles do not yield a canonical partitioning of the mesh into subparts, and does not involve repeating the payload in mesh regions (whose location and definition are not controlled by the watermarking system, but completely content-dependent).

To that end, a method for inserting features into a three-dimensional object is disclosed. The features correspond to original features of the three-dimensional object meaning that such features represent information relative to the so-called reference primitive. A three-dimensional object comprises a plurality of vertices. The inserting method comprises:

determining a reference shape using the original features;
  determining a set of vertices on the three-dimensional object wherein a vertex of the set of vertices is at the intersection between the reference shape and the three-dimensional object;
  modifying the local neighborhood of each vertex of the set of vertices so that said local neighborhood is close to a set of target shapes.
  As described in In a second aspect, the present principles further propose a method for obtaining or retrieving such features from a three-dimensional object. The method for obtaining the features comprises:

obtaining, from the three-dimensional object, anchor vertices whose local neighborhood is close to a set of target shapes;
  fitting a reference shape onto the anchor vertices, and
  obtaining the features using the fitted reference shape wherein each anchor vertex correspond to a vertex of the original object at the intersection between the reference shape and the original three-dimensional object.

According to a first particular embodiment, fitting a reference shape comprises a rejection of outlier anchor points and computing a fitting score.

According to second particular embodiment, fitting a reference shape comprises sorting the anchor vertices according to the distance between their local neighborhood and the set of target shapes; fitting the reference shape using an increasing number of sorted anchor vertices and computing a fitting score for each fitted reference shape; and obtaining the fitted reference shape that is associated with the fitting score reaching a fitting threshold.

In a refinement according to first and second particular embodiment, the method further comprises selecting the fitted reference shape with the best fitting score among the fitted reference shape obtained according to first embodiment and the fitted reference shape obtained according to second preferred embodiment.

According to different variants, the reference shape comprises an ellipsoid, a sphere.

According to an advantageous characteristic, obtaining the features of the 3D object using the fitted reference shape comprises computing the center of mass of the fitted reference shape.

According to an advantageous characteristic of the variant where the reference shape is a sphere, obtaining the features using the fitted reference shape comprises computing the radii of fitted sphere.

According to another embodiment, obtaining anchor vertices and fitting a reference shape are repeated for at least two reference shapes and features are obtained using at least two fitted reference shapes.

In a third aspect, the present principles are directed to a three-dimensional object resulting from the disclosed inserting method.

In a fourth aspect, the present principles are directed to a device for inserting features into a three-dimensional object comprising at least one processor configured to implement the disclosed method. Besides the present principles are directed to a device for inserting features into a three-dimensional object comprising means for implementing the disclosed method.

In a fifth aspect, the present principles are directed to a device for obtaining features from a three-dimensional object comprising at least one processor configured to implement the disclosed method. Besides the present principles are directed to a device for obtaining features from a three-dimensional object comprising means for implementing the disclosed method.

In a sixth aspect, the present principles are directed to a computer program product comprising program code instructions to execute the steps of the disclosed methods, according to any of the embodiments and variants disclosed, when this program is executed on a computer.

In a seventh aspect, the present principles are detected to a processor readable medium having stored therein instructions for causing a processor to perform at least the steps of the disclosed methods, according to any of the embodiments and variants disclosed.

While not explicitly described, the present embodiments may be employed in any combination or sub-combination.

Besides, any characteristic or variant described for the method inserting or the method for obtaining the features is compatible with a device intended to process the disclosed method and with a computer-readable storage medium storing program instructions.

BRIEF DESCRIPTION OF THE DRAWINGS

Other characteristics and advantages of the present principles will appear through the description of a non-limiting embodiments, which will be illustrated, with the help of the enclosed drawings.

DETAILED DESCRIPTION OF PREFERRED EMBODIMENTS

Figure 1:
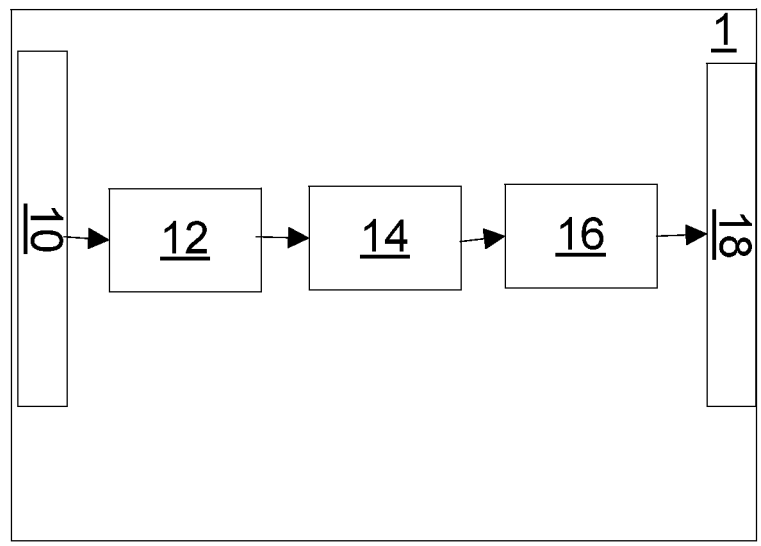
FIG. 1 illustrates a processing device implementing the inserting method according to a particular embodiment.

FIG. 1 depicts a processing device 1 for inserting features into a three-dimensional object according to a specific and non-limitative embodiment of the present principles. The processing device 1 comprises an input 10 configured to receive a 3D object. Meshes are assumed to be piecewise-linear approximations of the surface boundary of 3D objects. They are formally defined by a set of vertices V, a set of edges E and a set of facets F. 3D watermarking methods focus on the common triangle mesh representation. As such, the three-dimensional object or its representation comprises a plurality of vertices. The features, inserted in the 3D object are features corresponding to original features of the three-dimensional object and used for watermarking such as the center of mass, the minimum and maximum distances from the center of mass to vertices in a non-limitative example. According to different embodiments, the source belongs to a set comprising:

- a local memory, e.g. a video memory, a RAM, a flash memory, a hard disk;
- a storage interface, e.g. an interface with a mass storage, a ROM, an optical disc or a magnetic support;
- a communication interface, e.g. a wired interface (for example a bus interface, a wide area network interface, a local area network interface) or a wireless interface (such as a IEEE 802.11 interface or a Bluetooth interface); and
- a shape capturing circuit e.g. a 3D scanner.

The input 10 is linked to a module 12 configured to determine a reference shape using the original features. In a non-limitative example, such reference shape is a sphere whose center is aligned with the center of mass of the 3D object and the radius corresponds to a distance in the 3D object. The properties of the reference shape are described hereafter with the methods with more details. The module 14 is then configured to determine a set of vertices on the 3D object wherein a vertex of the set of vertices is at the intersection between the reference shape and the three-dimensional object. The skilled in the art will appreciate by "at the intersection" means "closed to the intersection". For a plurality of vertices in this set, the module 16 is then configured to modify the local neighborhood of each vertex so that said local neighborhood is close to a set of target shapes. Such modified vertices are called anchor vertices, since they are recoverable thanks to their local properties: a secret target shape can be fitted on the local neighborhood of an anchor vertex. In other words, the signature of a local neighborhood of an anchor vertex is closed to a target signature. Target shapes are, in a non-limitative example, a collection of spheres, paraboloids or more generally quadric geometrical models characterized by a set of parameter values. The target shapes are described with the methods with more details. A method for introducing anchor vertices is disclosed by a European patent application entitled "Method for watermarking a three-dimensional object and method for obtaining a payload from a three-dimensional object" from the same applicant filed on the same day. The module 16 is linked to an output 18. The 3D object with the anchor points can be stored in a memory. As an example, the 3D object is stored in a remote or in a local memory, e.g. a video memory or a RAM, a hard disk. In a variant, the 3D object with anchor points is sent to a watermark embedder by means of a storage interface, e.g. an interface with a mass storage, a ROM, a flash memory, an optical disc or a magnetic storage and/or transmitted over a communication interface, e.g. an interface to a point-to-point link, a communication bus, a point to multipoint link or a broadcast network. In another variant, the 3D object is printed using a 3D printer.

Figure 2:
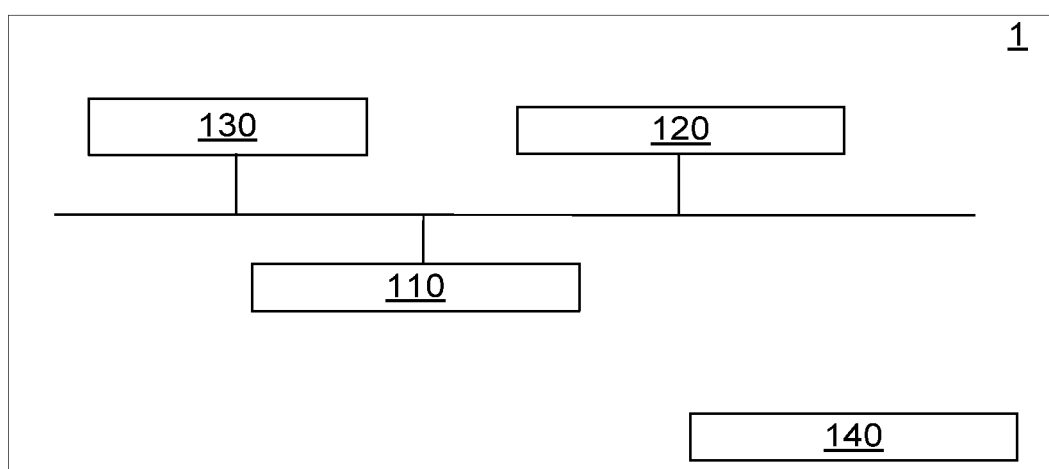
FIG. 2 illustrates an exemplary architecture of the processing device of FIG. 1, according to a specific and non-limitative embodiment.

FIG. 2 represents an exemplary architecture of the processing device 1 according to a specific and non-limitative embodiment of the present principles. The processing device 1 comprises one or more processor(s) 110, which is(are), for example, a CPU, a GPU and/or a DSP (English acronym of Digital Signal Processor), along with internal memory 120 (e.g. RAM, ROM, EPROM). The processing device 1 comprises one or several Input/Output interface(s) 130 adapted to display output information and/or allow a user entering commands and/or data (e.g. a keyboard, a mouse, a touchpad, a webcam, a display); and a power source 140 which may be external to the processing device 1. The processing device 1 may also comprise network interface(s) (not shown). According to an exemplary and non-limitative embodiment, the processing device 1 further comprises a computer program stored in the memory 120. The computer program comprises instructions which, when executed by the processing device 1, in particular by the processor 110, make the processing device 1 carry out the processing method described in FIG. 6. According to a variant, the computer program is stored externally to the processing device 1 on a non-transitory digital data support, e.g. on an external storage medium such as a HDD, CD-ROM, DVD, a read-only and/or DVD drive and/or a DVD Read/Write drive, all known in the art. The processing device 1 thus comprises an interface to read the computer program. Further, the processing device 1 could access one or more Universal Serial Bus (USB)-type storage devices (e.g., "memory sticks.") through corresponding USB ports (not shown).

According to exemplary and non-limitative embodiments, the processing device 1 is a device, which belongs to a set comprising:

- a mobile device;
- a communication device;
- a game device;
- a tablet (or tablet computer);
- a laptop (or desktop);
- a 3D scanner;
- a 3D printer;
- a motion capture device;
- an encoding chip;
- a decoding chip;
- a 3D mesh server; and
- a 3D mesh sharing platform.

Figure 3:
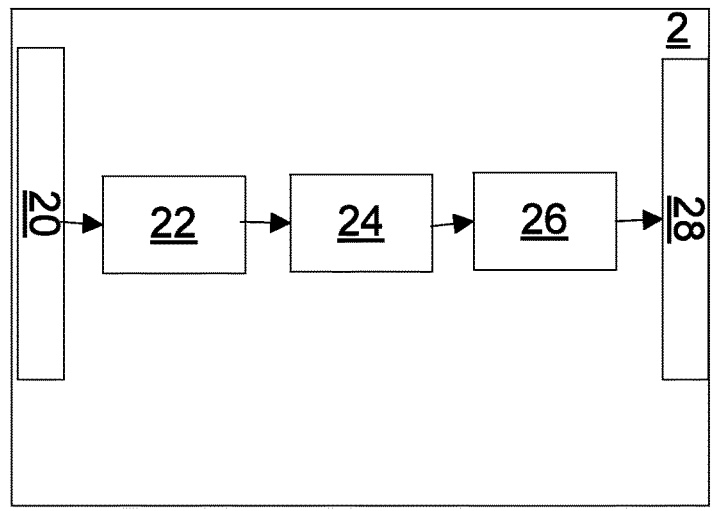
FIG. 3 illustrates a processing device implementing the obtaining method according to a particular embodiment.

FIG. 3 depicts a processing device 2 for obtaining or retrieving such embedded features from a three-dimensional object according to a specific and non-limitative embodiment of the present principles. The processing device 2 comprises an input 20 configured to receive a 3D object from a source. In the common mesh representation, the tree-dimensional object comprises a plurality of vertices.

According to different embodiments, the source belongs to a set comprising:
- a local memory, e.g. a video memory, a RAM, a flash memory, a hard disk;
- a storage interface, e.g. an interface with a mass storage, a ROM, an optical disc or a magnetic support;
- a communication interface, e.g. a wired interface (for example a bus interface, a wide area network interface, a local area network interface) or a wireless interface (such as a IEEE 802.11 interface or a Bluetooth interface); and
- a shape capturing circuit e.g. 3D scanner.

The input 20 is linked to a module 22 configured to obtain, from the three-dimensional object, anchor vertices whose local neighborhood is close to a set of target shapes. Such recovering of anchor vertices based on local neighborhood are described hereafter with the methods with more details. The module 24 is then configured for fitting a reference shape onto the anchor vertices given that each anchor vertex corresponds to a vertex of the original object at the intersection between the reference shape and the original three-dimensional object. Using the fitted reference shape, the module 26 is then configured to obtain the features (such as the center of mass, the minimum and maximum distance from the centers of mass to vertices in a non-limitative example) since the reference shape was determined using the original features. The module 26 is linked to an output 28. The 3D object and the extracted features can be stored in a memory. As an example, the 3D object and features is stored in a remote or in a local memory, e.g. a video memory or a RAM, a hard disk. In a variant, the 3D object and associated features are forwarded to a watermark detector by means of a storage interface, e.g. an interface with a mass storage, a ROM, a flash memory, an optical disc or a magnetic storage and/or transmitted over a communication interface, e.g. an interface to a point-to-point link, a communication bus, a point to multipoint link or a broadcast network.

Figure 4:
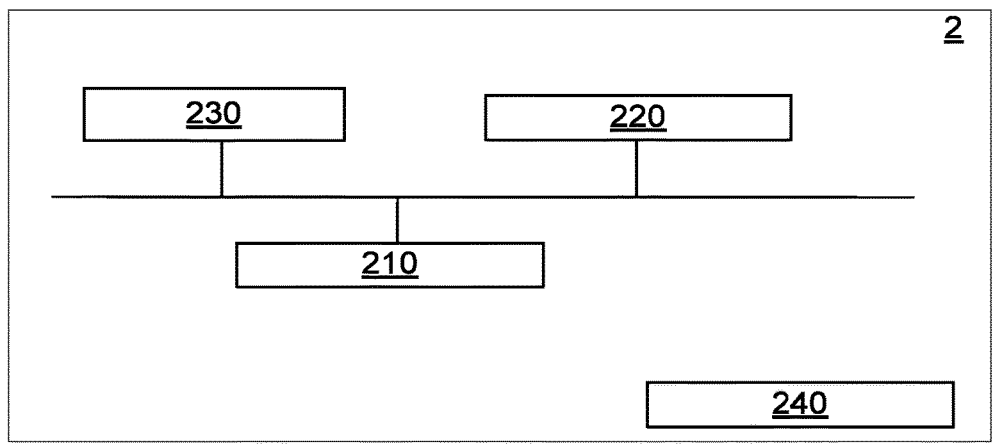
FIG. 4 illustrates an exemplary architecture of the processing device of FIG. 3, according to a specific and non-limitative embodiment.

FIG. 4 represents an exemplary architecture of the processing device 2 according to a specific and non-limitative embodiment of the present principles. The processing device 2 comprises one or more processor(s) 210, which is(are), for example, a CPU, a GPU and/or a DSP (English acronym of Digital Signal Processor), along with internal memory 220 (e.g. RAM, ROM, EPROM). The processing device 2 comprises one or several Input/Output interface(s) 230 adapted to display output information and/or allow a user entering commands and/or data (e.g. a keyboard, a mouse, a touchpad, a webcam, a display); and a power source 240 which may be external to the processing device 2. The processing device 2 may also comprise network interface(s) (not shown). According to an exemplary and non-limitative embodiment, the processing device 2 further comprises a computer program stored in the memory 220. The computer program comprises instructions which, when executed by the processing device 2, in particular by the processor 220, make the processing device 2 carry out the processing method described in FIG. 7. According to a variant, the computer program is stored externally to the processing device 2 on a non-transitory digital data support, e.g. on an external storage medium such as a HDD, CD-ROM, DVD, a read-only and/or DVD drive and/or a DVD Read/Write drive, all known in the art. The processing device 2 thus comprises an interface to read the computer program. Further, the processing device 2 could access one or more Universal Serial Bus (USB)-type storage devices (e.g., "memory sticks.") through corresponding USB ports (not shown).

According to exemplary and non-limitative embodiments, the processing device 2 is a device, which belongs to a set comprising:
- a mobile device;
- a communication device;
- a game device;
- a tablet (or tablet computer);
- a laptop (or desktop);
- a 3D scanner;
- a 3D printer;
- an encoding chip;
- a decoding chip;
- a 3D mesh server; and
- a 3D mesh sharing platform.

Figure 5:
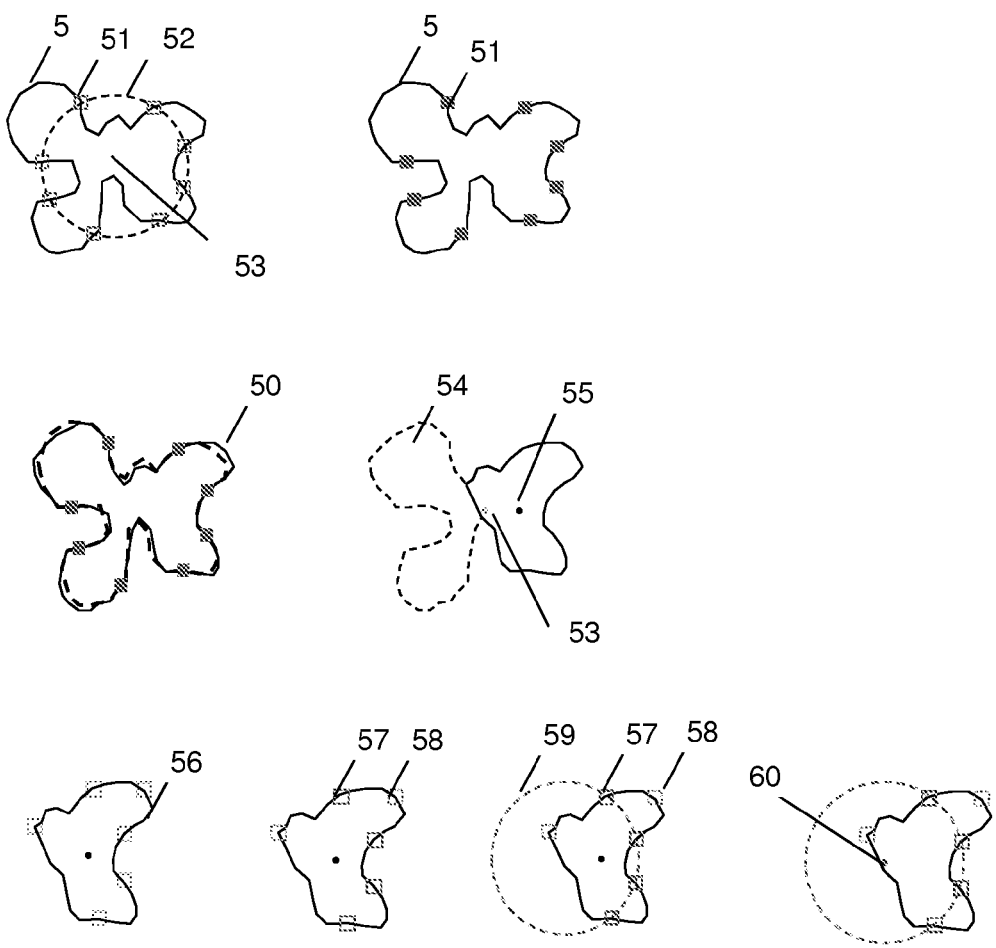
FIG. 5 illustrates a 3D object implementing the inserting and obtaining method according to a particular embodiment.

FIG. 5 illustrates a 3D object 5 resulting from the inserting and obtaining methods according to a specific and non-limitative embodiment of the present principles. Without loss of generality, the process is exemplified in 2D for clarity. A 3D object 5, that is aimed to a watermark algorithm using original features of the 3D object (such as the center of mass 53, the maximum distance between the center of mass and a vertex), is processed. Vertices 51 on the surface of the mesh of the 3D object 5 that are close to the intersection with a reference shape, characterized by parameters determined using original features corresponding to the 3D object, are identified. In the non-limitative example depicted in FIG. 5, this reference shape is a sphere 52 whose center is aligned with the center of mass 53 of the original 3D object. Local singularities are introduced on a plurality of these identified vertices by modifying their local neighborhoods without altering the selected vertices themselves so that their local neighborhood is close to a predefined set of secret target shapes. A three-dimensional object 5 is thus obtained which comprises a set of anchor vertices 51 wherein each anchor vertex is at the intersection between the reference shape 52 and the three-dimensional object 5; the reference shape being determined using original features 53 corresponding to the original three-dimensional object, the local neighborhood of each anchor vertex being close to a set of target shapes.

A watermark is then embedded in the whole 3D object (not depicted), while making sure not to alter the local neighborhoods of the anchor vertices. After the watermarked object 50 is distributed, parts of the objects 54 get cropped. Such cropping strongly affects the location of the center of mass 55 and thereby is likely to disrupt watermark communications. In other words, the watermark detector is unable to recover the embedded watermark, although it is still there, because the communications parameters shared between the watermark embedder and detector have been tampered with.

Thanks to the obtaining method, candidate feature points 56 are determined using a detector of local singularities. Outliers 58 are discarded relying on the assumption that anchor vertices with local singularities are expected to be placed on a reference shape, namely a sphere in the non-limitative example of FIG. 5. The reference shape is then fitted using the remaining feature points 57 and some geometric parameters of this fitted reference shape are exploited to determine the original features corresponding to the original 3D object. In the non-limitative example, a sphere 59 is fitted using the retained anchor vertices carrying singularities 57 and the estimated center of the sphere 60 is used instead of the center of mass of the cropped object 55 to run the watermark decoder.

Figure 6:
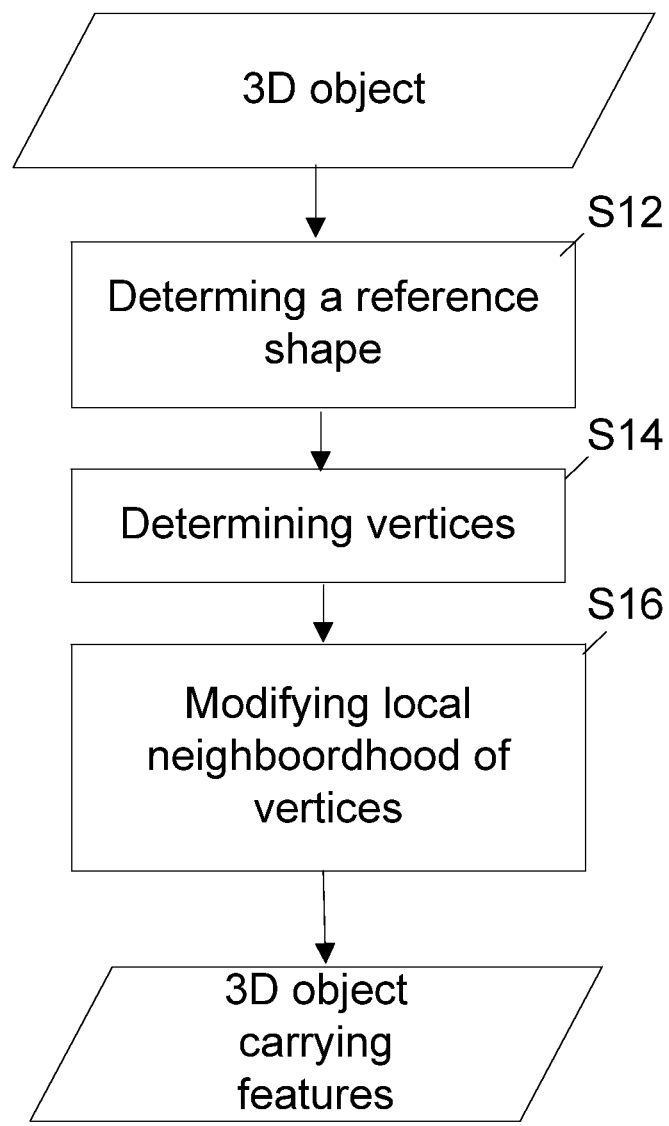
FIG. 6 illustrates a flowchart of the method for inserting features in a 3D object according to a preferred embodiment.

FIG. 6 illustrates a flowchart of the method for inserting features in a 3D object according to a preferred embodiment. The steps of the method are described on the 3D object 5 of FIG. 5. In a preferred embodiment, the inserting method is a pre-processing step to the watermarking system described in "*Triangle Surface Mesh Watermarking based on a Constrained Optimization Framework*" (IEEE Transactions on Information Forensics and Security, 2014) by the same authors. As a reminder, the detector of this watermarking system requires three critical pieces of information to operate: (i) the center of mass 53 of the 3D mesh, (ii) the maximum M of the distances between the vertices of the 3D mesh and the center of mass 53, and (iii) the minimum m of the distances between the vertices of the 3D mesh and the center of mass 53. The objective is therefore to obtain an embodiment allowing the recovery of this information at detection in case the 3D object has been attacked.

In a step S12, a reference shape 52 is determined using original features of the 3D object such as the three critical pieces of information of the preferred watermarking system. According to a first variant, the reference shape is a sphere centered at the mesh center of mass 53, and with a radius R equal to the average distance between all the vertices and the center of mass. According to a second variant, the reference shape is an ellipsoid centered at the mesh center of mass, with its 3 principal axes aligned on the mesh principal axes, and with 3 half-axis values defined as a function of the critical values m and M. At detection, recovering half-axis values of the ellipsoid allows to recover the critical value m and M.

According to another variant, at least two reference shapes are determined. For instance, a first and a second sphere centered at the mesh center of mass but having different radii $R_1$ and $R_2$ are determined. At detection, the values of these radii can then be exploited to recover the critical values m and M. For instance, one could define a linear system:

$$R_1 = a_1 \cdot M + b_1 \cdot m$$

$$R_2 = a_2 \cdot M + b_2 \cdot m$$

where $a_1$, $a_2$, $b_1$, and $b_2$ are parameters which may advantageously be kept secret. For instance, one could use $a_1 = b_2 = 0.5 + \beta$ and $b_1 = a_2 = 0.5 - \beta$ with $\beta \in\ ]0, 0.5[$, e.g. ($\beta = 0.1$. Another way to define these parameters can be to use a key-dependent strategy to increase the security of the watermarking system by obfuscating the likely locations of the anchor vertices that will be used for resynchronization. At detection, knowing the parameter values and recovering $R_1$ and $R_2$ allows to recover the critical value m and M. Note that this property holds even in case of scaling, in contrast to the solution that sends side information to the decoder.

In a step S14, a subset of vertices on the mesh surface of the three-dimensional original object is determined such that these vertices are located at the intersection between the reference shape 52 and surface of the three-dimensional object 5. According to the first variant where the reference shape is a sphere, a subset of vertices located on the reference sphere centered at the mesh center of mass 53 and with a determined radius R is identified. Furthermore, this subset is trimmed so that the local neighborhoods of the selected vertices do not overlap. This constraint guarantees that there will be no interference between the selected vertices, due to the modifications in their local neighborhood in a later step of the method to introduce singularities. According to the variant comprising two spheres, two subsets, each corresponding to a reference sphere, are determined.

In a step S16, the local neighborhood of each vertex of the set of vertices is modified so that its local neighborhood is close to a secret set of predefined target shapes. In other words, the positions of the mesh vertices belonging to the local neighbourhood around the selected vertices are altered in such a way that these selected vertices can be automatically detected as anchor points by the watermark detector based on their singularity. Advantageously, these modifications leave the selected vertices unaltered e.g. to guarantee that they remain on the surface of the reference shape. In the non-limitative example of FIG. 5, the selected vertices remain on the surface of the surface of the sphere 52, characterized by a center 53 directly related to the center of mass of the original 3D object. Such a method is disclosed by a European patent application entitled "Method for watermarking a three-dimensional object and method for obtaining a payload from a three-dimensional object" from the same applicant filed on the same day. According to the variant comprising two spheres, and in order to differentiate the anchor vertices of the two spheres, the embedding algorithm defined in the European patent application entitled "Method for watermarking a three-dimensional object and method for obtaining a payload from a three-dimensional object", uses different sets of secret parameters for each sphere, e.g., a different quantization grid for the parameters of the local geometric model or different watermark payloads per sphere. A three-dimensional object 5 is thus obtained which carries a set of anchor vertices 51.

Then, the watermark embedding procedure is performed as known from prior art for instance in "*Triangle Surface Mesh Watermarking based on a Constrained Optimization Framework*" (IEEE Transactions on Information Forensics and Security, 2014) by the same authors. In an advantageous variant, the vertices which have been modified for resynchronization purpose are left untouched. As a result, the embedding procedure to convey watermark information will not interfere with the modifications introduced for resynchronization.

Figure 7:
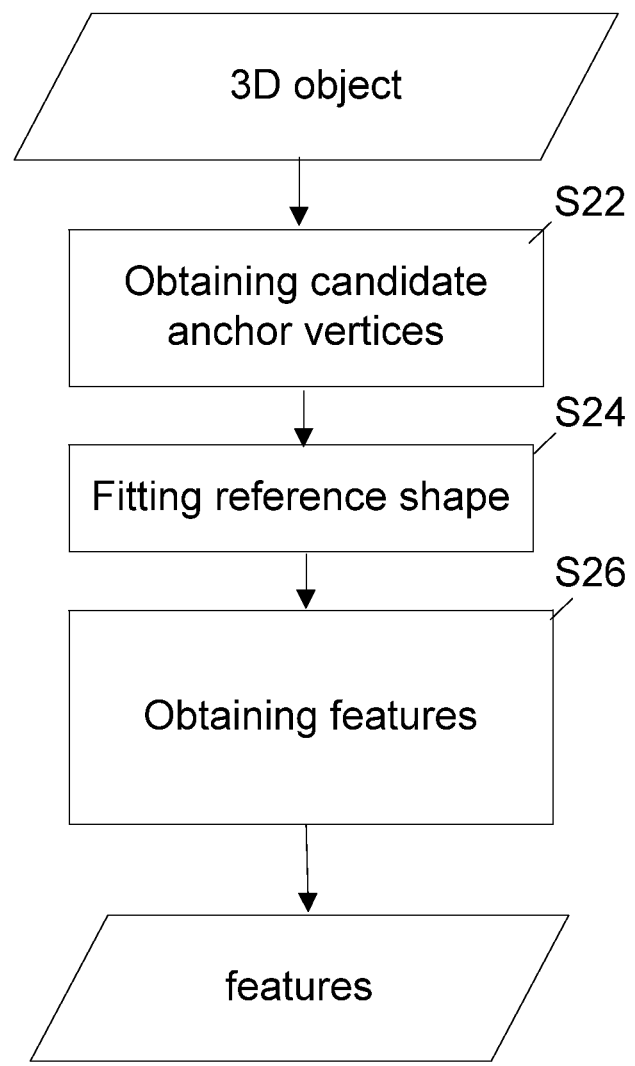
FIG. 7 illustrates a flowchart of the method for obtaining features from a 3D object according to a preferred embodiment.

FIG. 7 illustrates a flowchart of the method for obtaining features from a 3D object according to a preferred embodiment. The steps of the method are described on the cropped 3D object 5 of FIG. 5.

In a step S22, candidate anchor vertices whose local neighborhood is close to a secret set of target shapes are obtained from the three-dimensional object 5. As disclosed in the European patent application entitled "Method for watermarking a three-dimensional object and method for obtaining a payload from a three-dimensional object", a set of candidate feature points 57, 58 is identified on the mesh using some secret parameters shared with the embedder e.g. a quantization grid. For the variant where multiple subsets corresponding to multiple reference shapes have been selected during embedding, the detector is run repeatedly with different sets of secret parameters to identify different sets of candidate anchor vertices.

In a step 24, a reference shape 59 is fitted on the candidate anchor vertices 57 since each of these vertices is expected to correspond to a vertex of the original 3D mesh at the intersection with the reference shape. In an optional consolidation processing, the set of anchor vertices is trimmed to discard outliers 58, i.e., vertices that have been mistaken for anchor vertices.

In a first variant, this consolidation processing relies on geometric information. For instance, using a Random Consensus Sample approach such as the one disclosed in "*Random Sample Consensus: A Paradigm for Model Fitting with Applications to Image Analysis and Automated Cartography*" (Communications of ACM, 1981) by Fischler and Bolles. Eventually, such an algorithm provides a shortlist of candidate anchor vertices that all lie within a specified distance of the corresponding fitted reference shape. Such an algorithm attempts at maximizing the size of this shortlist while rejecting outliers.

In a second variant, the consolidation process relies on soft watermarking information of the anchor point detector, e.g., the distance between the signatures of the feature points and the secret quantization grid used for watermarking. In this case, the candidate anchor vertices are sorted according to their soft watermarking information. Then, the fitting algorithm for the reference shape is applied using an increasing number of sorted anchor vertices and a fitting score is recorded. The iterative process stops when the fitting score reaches a threshold. The last fitted reference shape associated to this fitting score is then kept and the remaining sorted vertices (false positives) are discarded.

In a step 26, the features of the 3D object are recovered using the fitted reference shape since the reference shape has been determined using original features. More precisely, the estimated parameters of the reference shape are used to recover the center of mass and the critical values m and M. The man skilled in the art will appreciate that the recovered features are not necessarily the features of the original 3D object. By design, in case of cropping, the correct center of mass is recovered. Moreover, in case of scaling, the recovered critical values m and M are scaled accordingly, as required to successfully decode the watermark information in a subsequent step. This key differentiating property clearly demonstrate the added value of the disclose present principles with respect to sending side information to the decoder for instance.

The follow-up watermark detection algorithm, e.g. "*Triangle Surface Mesh Watermarking based on a Constrained Optimization Framework*" (IEEE Transactions on Information Forensics and Security, 2014) by the same authors, can then be run using these values.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a 3D mesh coder, a 3D mesh decoder, a 3D mesh codec, a web server, a set-top box, a laptop, a personal computer, a 3D scanner, a 3D printer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a Blu-ray, a DVD often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for obtaining features from a three-dimensional object, wherein said features correspond to an original three-dimensional object and represent information relative to a reference primitive, said method comprising:
   obtaining anchor vertices among a plurality of vertices representing said three-dimensional object, wherein a local neighborhood of said anchor vertices is close to a set of target shapes;
   fitting a reference shape onto said anchor vertices;
   obtaining said features using said fitted reference shape;

wherein each anchor vertex corresponds to a vertex among a plurality of vertices representing the original object at the intersection between said reference shape and said original three-dimensional object.

2. The method according to claim 1 wherein fitting a reference shape comprises a rejection of outlier anchor points and computing a fitting score.

3. The method according to claim 1 wherein fitting a reference shape comprises:
sorting said anchor vertices according to a distance between local neighborhood of each anchor vertex and said set of target shapes;
fitting said reference shape using an increasing number of said sorted anchor vertices and computing a fitting score for each fitted reference shape;
obtaining said fitted reference shape that is associated with the fitting score reaching a threshold.

4. The method according to claim 2, further comprising selecting the fitted reference shape with the best fitting score among said fitted reference shape obtained according to claim 2 and said fitted reference shape.

5. The method according to claim 1 wherein said reference shape comprises an ellipsoid.

6. The method according to claim 1 wherein said reference shape comprises a sphere.

7. The method according to claim 1 wherein obtaining said features using said fitted reference shape comprises computing the center of mass of said fitted reference shape.

8. The method according to claim 6 wherein obtaining said features using said fitted reference shape comprises computing the radii of said fitted reference shape.

9. The method according to claim 1 wherein obtaining anchor vertices and fitting a reference shape are repeated for at least two reference shapes and wherein features are obtained using at least two fitted reference shapes.

10. A method for inserting features into a three-dimensional object, wherein said features correspond to said three-dimensional object said method comprising:
determining a reference shape using said features;
determining a set of anchor vertices among a plurality of vertices representing said three-dimensional object, wherein an anchor vertex is at the intersection between said reference shape and said three-dimensional object;
modifying a local neighborhood of each anchor vertex so that said local neighborhood is close to a set of target shapes.

11. A device for obtaining features from a three-dimensional object, wherein said features correspond to an original three-dimensional object and represent information relative to a reference primitive, the device comprising at least one processor configured to:
obtain anchor vertices among a plurality of vertices representing said three-dimensional object, wherein a local neighborhood of said anchor vertices is close to a set of target shapes;
fit a reference shape onto said anchor vertices;
obtain said features using said fitted reference shape;
wherein each anchor vertex corresponds to a vertex among a plurality of vertices representing the original three-dimensional object at the intersection between said reference shape and said original three-dimensional object.

12. The device according to claim 11 wherein said at least one processor is configured to reject outlier anchor points and compute a fitting score.

13. The device according to claim 11 wherein said at least one processor is configured to:
sort said anchor vertices according to a distance between local neighborhood of each anchor vertex and said set of target shapes;
fit said reference shape using an increasing number of said sorted anchor vertices and computing a fitting score for each fitted reference shape;
obtain said fitted reference shape that is associated with the fitting score reaching a threshold.

14. The device according to and claim 13 wherein said at least one processor is configured to select the fitted reference shape with the best fitting score among said fitted reference shape and said fitted reference shape obtained according to claim 13.

15. The device according to claim 11 wherein said reference shape comprises an ellipsoid.

16. The device according to claim 11 wherein said reference shape comprises a sphere.

17. The device according to claim 11 wherein said at least one processor is configured to compute the center of mass of said fitted reference shape.

18. The device according to claim 16 wherein said at least one processor is configured to compute the radii of said fitted reference shape.

19. The device according to claim 11 wherein said at least one processor is configured to obtain anchor vertices and fit a reference shape for at least two reference shapes and wherein features are obtained using at least two fitted reference shapes.

20. A non-transitory program storage device, readable by a computer, tangibly embodying a program of instructions executable by the computer to perform a method for obtaining features from a three-dimensional object, wherein said features correspond to an original three-dimensional object and represent information relative to a reference primitive, the method comprising:
obtaining anchor vertices among a plurality of vertices representing a three-dimensional object; wherein a local neighborhood of said anchor vertices is close to a set of target shapes;
fitting a reference shape onto said anchor vertices;
obtaining features corresponding to an original three-dimensional object using said fitted reference shape;
wherein each anchor vertex corresponds to a vertex among a plurality of vertices representing the original three-dimensional object at the intersection between said reference shape and said original three-dimensional object.

* * * * *